(12) United States Patent
Martin et al.

(10) Patent No.: US 6,820,340 B1
(45) Date of Patent: Nov. 23, 2004

(54) LOW PROFILE HACKSAW

(75) Inventors: James A. Martin, Baltimore, MD (US); Gregory J. Erisoty, Riverton, CT (US)

(73) Assignee: The Stanley Works, New Britain, CT (US)

( * ) Notice: Subject to any disclaimer, the term of this patent is extended or adjusted under 35 U.S.C. 154(b) by 565 days.

(21) Appl. No.: 09/291,983

(22) Filed: Apr. 15, 1999

(51) Int. Cl.$^7$ .......................... B27B 21/02; B27B 21/06
(52) U.S. Cl. .......................... 30/506; 30/166.3; 30/513
(58) Field of Search .................. 30/506–513, 166.3, 30/144, 514, 517, 525; D8/96

(56) References Cited

U.S. PATENT DOCUMENTS

| | | | | |
|---|---|---|---|---|
| 101,397 A | * | 3/1870 | Wells | 30/513 |
| 156,964 A | | 11/1874 | Abel et al. | 76/112 |
| 252,570 A | * | 1/1882 | Woodrough | 30/510 |
| 344,234 A | | 6/1886 | Barrick | 30/507 |
| 375,061 A | | 12/1887 | French | 30/506 |
| 653,947 A | * | 7/1900 | Condon | 30/513 |
| 679,653 A | | 7/1901 | Wells | 30/513 |
| 979,920 A | | 12/1910 | Bennett | 30/507 |
| 1,174,893 A | | 3/1916 | Page | 30/507 |
| 1,245,545 A | | 11/1917 | Williams | 30/512 |
| 1,446,674 A | | 2/1923 | Thompson | 30/513 |
| 1,471,214 A | | 10/1923 | Sieben | 30/510 |
| 1,636,853 A | * | 7/1927 | Conner | 30/506 |
| 1,694,150 A | | 12/1928 | Voss | 30/513 |
| 1,713,972 A | | 5/1929 | Lufkin | 30/513 |
| 2,137,742 A | | 11/1938 | Jack | 30/507 |
| 2,194,494 A | | 3/1940 | Carroll | 30/506 |
| 2,303,705 A | | 12/1942 | Persson | 30/507 |
| 2,330,854 A | * | 10/1943 | Wolfard | 30/506 |
| D151,725 S | | 11/1948 | Whitman et al. | D8/96 |
| D160,574 S | | 10/1950 | Carlson | D8/96 |
| 2,532,506 A | | 12/1950 | Mansfield | 30/511 |
| 2,546,660 A | | 3/1951 | Wilcox | 30/506 |
| 2,606,585 A | | 8/1952 | Collura | 30/506 |
| 2,612,920 A | | 10/1952 | Williams | 30/511 |
| 2,662,569 A | | 12/1953 | Swalinkavich, Jr. | 30/517 |
| 2,725,085 A | | 11/1955 | Doherty et al. | 30/506 |

(List continued on next page.)

OTHER PUBLICATIONS

U.S. patent application Ser. No. 09/371,220, Owens, filed Aug. 10, 1999.

*Primary Examiner*—Clark F. Dexter
(74) *Attorney, Agent, or Firm*—Pillsbury Winthrop LLP

(57) ABSTRACT

A low profile hacksaw comprising an elongated blade having a cutting edge. A rigid I-beam frame member has a forward end portion and a maximum height portion. Preferably, the maximum height portion is located at the rear end of the frame member, but it may be located intermediate the forward and rearward ends. The frame member has an arcuate portion which extends substantially the entire length between the forward end and maximum height portions and which curves downwardly and forwardly towards the forward end portion to provide the hacksaw with a low profile. A manually engageable handle is provided for manual grasping to enable performance of a cutting operation wherein the cutting edge of the tensioned blade is engaged with a work piece and moved forwardly and rearwardly to cut through the work piece. A releasable blade tensioning device provides a second blade mounting structure on which the other longitudinal end portion of the blade is removably mounted. The blade tensioning device is constructed and arranged to affect relative movement between the first and second blade mounting structures to tension the blade in the longitudinal direction thereof and thereby apply a rearwardly directed force to the forward end portion of the frame member. As a result, the rearwardly directed load applied to the forward end portion creates a bending moment which is distributed throughout and resisted by the frame member as a result of its curvature and I-beam configuration.

20 Claims, 6 Drawing Sheets

U.S. PATENT DOCUMENTS

| | | | |
|---|---|---|---|
| 2,725,911 A | 12/1955 | Glenn | 30/506 |
| 2,771,925 A | 11/1956 | Littman | 30/507 |
| 2,959,203 A | 11/1960 | Dreier | 30/513 |
| D204,726 S | 5/1966 | David | D14/354 |
| 3,329,186 A | 7/1967 | David | 30/508 |
| 3,329,187 A | 7/1967 | Cowley | 30/513 |
| 3,636,997 A | 1/1972 | Keymer | 30/513 |
| 3,702,627 A | 11/1972 | Dreier | 30/506 |
| 3,756,298 A | 9/1973 | West | 30/507 |
| 3,822,731 A | 7/1974 | Keymer | 30/513 |
| 4,256,156 A | 3/1981 | Biszantz et al. | 30/506 |
| 4,328,848 A | 5/1982 | Miller | 30/507 |
| 4,349,059 A * | 9/1982 | Hepworth et al. | 30/513 |
| 4,571,829 A | 2/1986 | Withers, Jr. | 30/144 |
| 4,835,869 A | 6/1989 | Waldherr | 30/507 |
| 5,063,675 A | 11/1991 | Michas et al. | 30/513 |
| D325,506 S | 4/1992 | Michas et al. | D8/96 |
| 5,406,760 A * | 4/1995 | Edwards | 52/239 |
| 5,471,752 A | 12/1995 | Koetsch | 30/513 |
| D370,610 S | 6/1996 | Neyton | D8/96 |
| 5,673,488 A | 10/1997 | Grayo | 30/513 |
| 5,768,788 A | 6/1998 | Arnold | 30/513 |
| 5,826,344 A | 10/1998 | Phelon et al. | 30/513 |
| D403,224 S * | 12/1998 | Martin et al. | D8/96 |
| 6,079,109 A | 6/2000 | Ranieri | 30/513 |

* cited by examiner

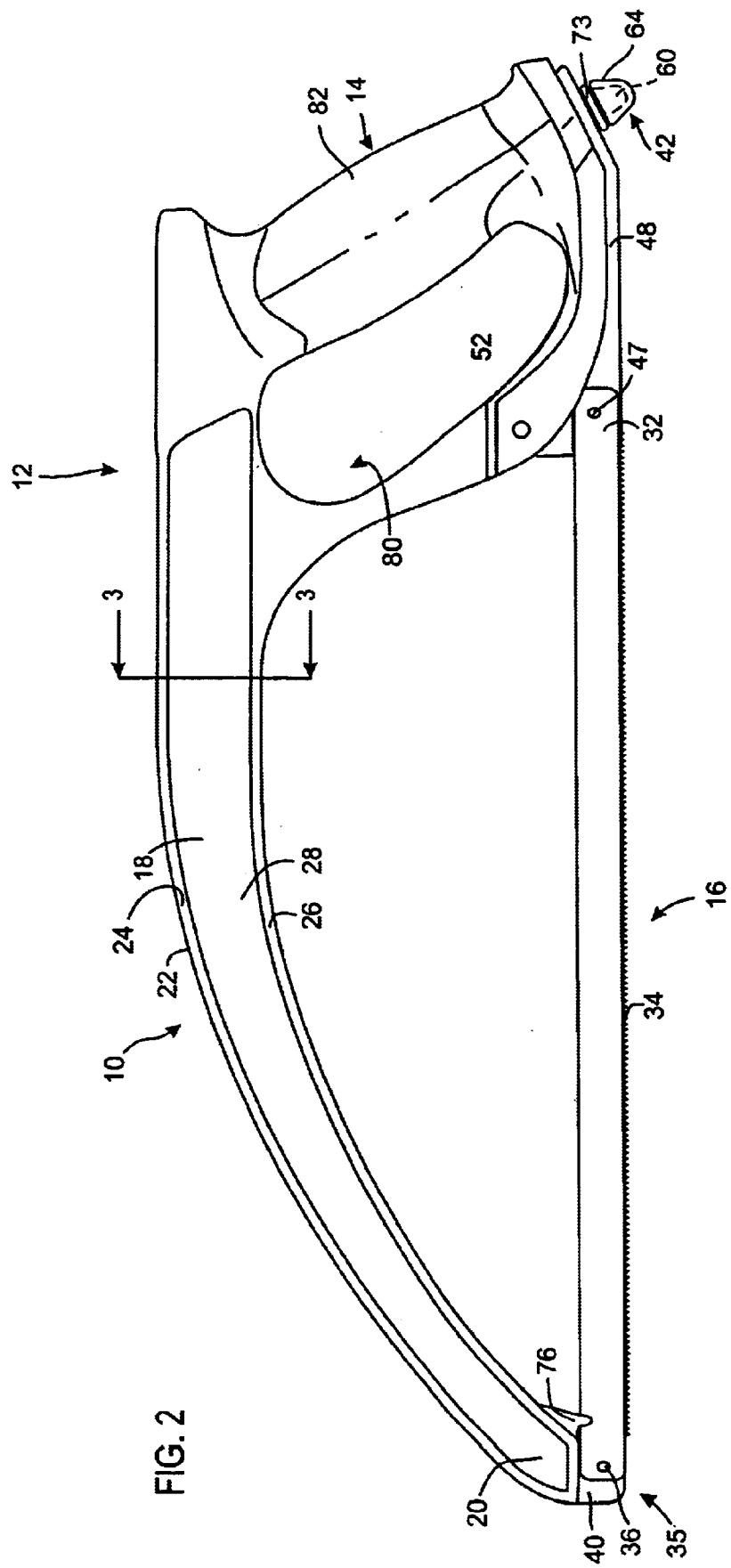

LOW PROFILE HACKSAW

FIELD OF THE INVENTION

The present invention relates to low profile hacksaws and, more particularly, to low profile hacksaws with an elongated I-beam frame member.

BACKGROUND OF THE INVENTION

Conventional hacksaws typically comprise a blade, a handle, and a metal frame member which extends forwardly from the handle parallel to the blade and then bends 90 degrees so as to extend downwardly. A tensioning device is provided on the lower portion of the handle and the blade is mounted and tensioned between the tensioning device and the lower forward end of the frame.

The overall configuration of this type of hacksaw is generally rectangular. This conventional construction has two significant shortcomings. First, the tension applied to the blade creates a bending moment in the frame member which is focused at the portion forming the 90 degree bend. When enough tension is applied, the frame tends to deform at the bend and may remain in a deformed state if the metal material goes beyond its yield point at the bend. Second, the overall distance between the blade and the upper portion of the frame member makes the hacksaw unsuitable for use in tight openings or other difficult to access areas.

Hacksaws with forwardly and downwardly sloped frames have been provided in the art. The sloped configuration of these frames allows the forward end of the hacksaw to be positioned in tight openings and other places that are difficult to access. The increased height towards the rear of these sloped hacksaws is desirable to allow the hacksaw to cut through large work pieces without having the frame overly limit the depth to which the saw can cut. An example of such a hacksaw is shown in U.S. Pat. No. 3,329,186. The hacksaw of the '186 patent, however, has a sharp bend towards the forward end thereof. Thus, although the sloped configuration of the hacksaw of the '186 patent allows it to be utilized in tighter areas than most hacksaws, the tension load applied by the blade will be focused on the sharp bend. This focused or concentrated load may cause permanent deformation at the sharp bend if sufficient tension is applied to the blade.

SUMMARY OF THE INVENTION

It is therefore an object of the present invention to provide a hacksaw with an improved frame arrangement wherein the tension load applied to the frame by the blade is distributed along the frame to prevent focusing or concentration of the load at one particular point thereof. To achieve this object, the present invention provides a low profile hacksaw comprising an elongated blade having a cutting edge. A hacksaw frame assembly comprises a rigid I-beam frame member that has a forward end portion and a maximum height portion. Preferably, the maximum height portion is located at the rear end of the frame member, but it may be located intermediate the forward and rearward ends. The frame member has an arcuate portion which extends substantially the entire length between the forward end and maximum height portions and which curves downwardly and forwardly towards the forward end portion to provide the hacksaw with a low profile. The hacksaw frame assembly further comprises a manually engageable handle for manual grasping to enable performance of a cutting operation wherein the cutting edge of the tensioned blade is engaged with a work piece and moved forwardly and rearwardly to cut through the work piece. A releasable blade tensioning device provides a second blade mounting structure on which the other longitudinal end portion of the blade is removably mounted. The blade tensioning device is constructed and arranged to affect relative tensioning movement between the first and second blade mounting structures to tension the blade in the longitudinal direction thereof. One of the first and second blade mounting structures is provided on the forward end portion of the frame member such that the tension in the blade applies a rearwardly directed load to the forward end portion to create a bending moment which is distributed along the arcuate portion.

As a result of providing the frame with a curved arcuate portion between its forward end portion and maximum height portion, the rearwardly directed load applied by the tensioned blade is distributed throughout the frame as a bending moment. Preferably, the arcuate portion is defined along at least one arc which has its center of curvature located below the blade. This preferred arrangement is advantageous because it ensures that the arcuate portion extends over a sufficient distance whereby the bending moment will not be focused at a particular point. It is to be understood that the frame member of the present invention may be composed of a number of interconnected arcuate portions each having different centers of curvature. However, it is preferred that the upper and lower I-beam end caps extend along the circumferences of two imaginary circles which have their centerpoints located below the blade and thus have constant radii. This arrangement has been found to provide optimal stress distribution in this type of arrangement. Preferably, the imaginary circles have different centerpoints.

The use of an I-beam in this construction is particularly advantageous because the I-beam provides the frame with increased rigidity without increasing the overall weight of the hacksaw. Specifically, an I-beam frame member of a given weight has a greater resistance to bending as a result of a substantial part of the mass being located at the upper and lower end caps in comparison to a square or cylindrical beam of the same weight.

The blade tensioning device is preferably the handle-mounted pivotal type which is disclosed in the present application. However, any one of a variety of tensioning devices may be used in its place. For example, the tensioning device could be provided at the forward end portion of the frame rather than on the handle. The tensioning device could also have a conventional threaded wing nut-type arrangement. Thus, it can be appreciated that the tensioning device used in the hacksaw of the present invention may be of any type, and is not limited to the disclosed embodiment.

Other objects, features, and advantages of the present invention will become apparent from the following detailed description, the accompanying drawings, and the appended claims.

BRIEF DESCRIPTION OF THE DRAWINGS

FIG. 2 is a side elevational view of one side of the hacksaw in an assembled condition;

DETAILED DESCRIPTION OF THE PREFERRED EMBODIMENT OF THE INVENTION

Figure 1:
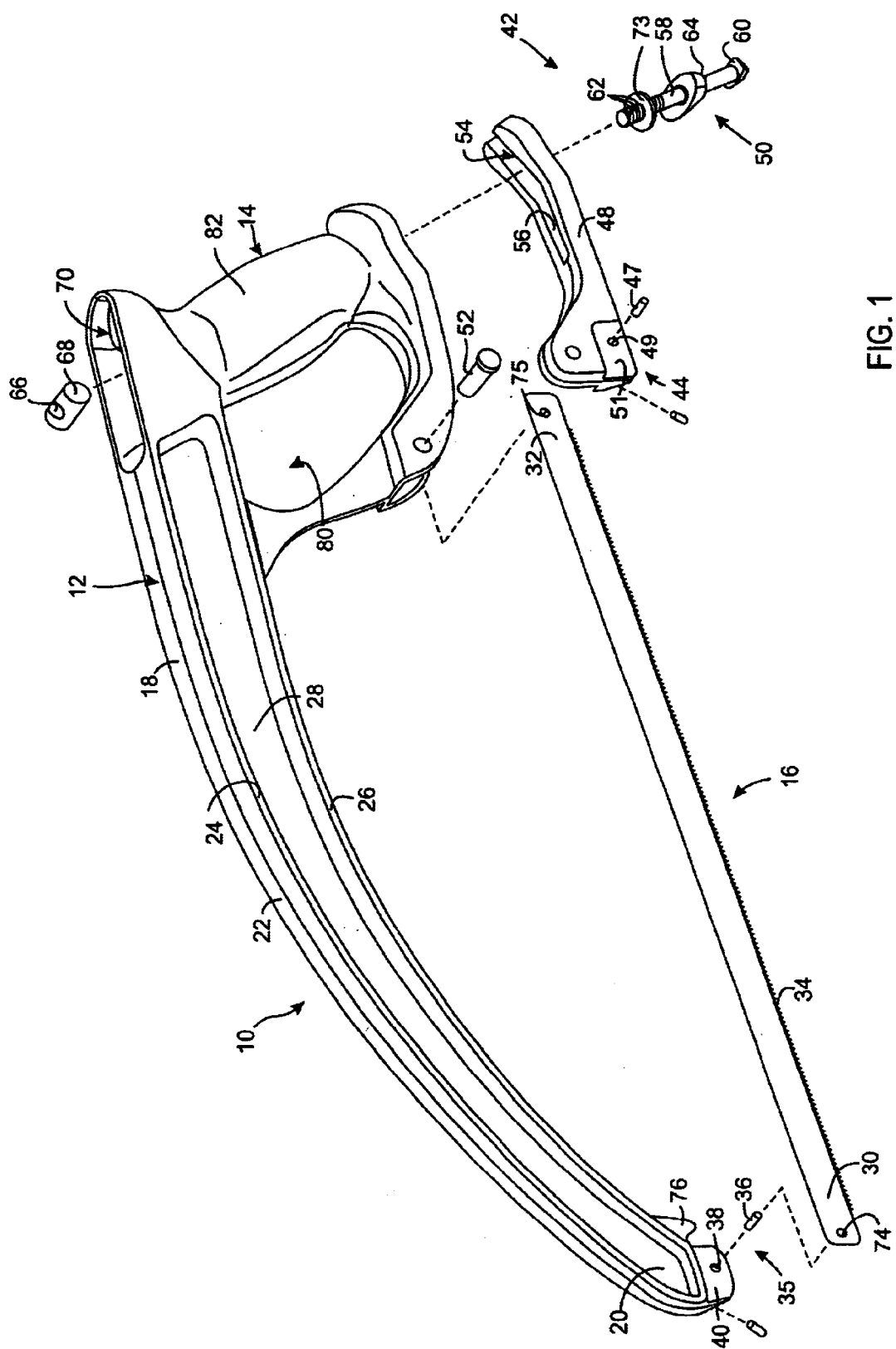
FIG. 1 is a partially exploded perspective view of a low profile hacksaw constructed according to the principles of the present invention.

FIG. 1 shows an exploded view of a low profile hacksaw, generally designated 10, constructed according to the principles of the invention. The low profile hacksaw 10 includes an elongated, rigid frame member 12 and a manually engageable handle 14 formed integrally with the frame member 12. An elongated blade 16 of conventional construction is shown releaseably mounted in the assembled hacksaw 10 in FIG. 2.

In the preferred embodiment of the low profile hacksaw 10, the handle 14 is formed integrally with the frame member 12 to form a one-piece construction with the frame member 12, but it is within the scope of the invention to provide a low profile hacksaw 10 in which the handle portion is formed separately and secured to the frame member in any conventional manner. Preferably the frame member 12 is constructed from metal, the preferred metal being cast aluminum, although zinc could also be used as can any other metal of suitable strength.

Figure 3:
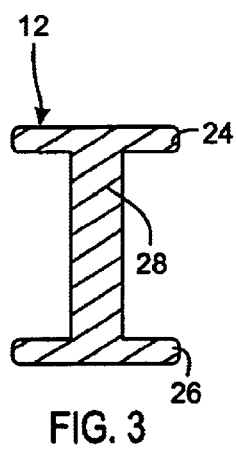
FIG. 3 is a cross-sectional view taken through the line 3—3 of FIG. 2.

As shown in FIG. 2, the frame member 12 extends forwardly from the handle 14 and has a rearward end portion 18 and a forward end portion 20. A cross-section through the frame member 12 shown in FIG. 3 shows that the frame member 12 has an I-beam configuration that includes an upper end cap 24 and a lower end cap 26 and a generally vertical web member 28 extending between the end caps 24, 26. The I-beam configuration is advantageous because it provides the frame member 12 with superior rigidity in comparison to frame members of the same weight with rectangular cross-sections.

The frame member 12 has an arcuate portion 22 which extends substantially the entire length between the forward end portion 20 and a maximum height portion denoted as M in the Figures. The maximum height portion M is defined as the point along the frame member 12 where both the generally vertical distance between the blade 16 and the lower end cap 26 of the frame member 12 is at a maximum and the arcuate portion 22 begins its forward and downward curvature. Preferably, the maximum height portion is in the vicinity of the rearward end portion 18. The arcuate portion 22 is curved downwardly and forwardly to provide the hacksaw 10 with a lower overall height at the forward end portion 20 of the frame member 12 than at the maximum height portion. The curvature of the frame member 12 is defined along at least one arc which has a center of curvature located below the elongated blade 16. The arc is indicated at 23 as a dashed centerline extending along the frame member 12.

Figure 4:
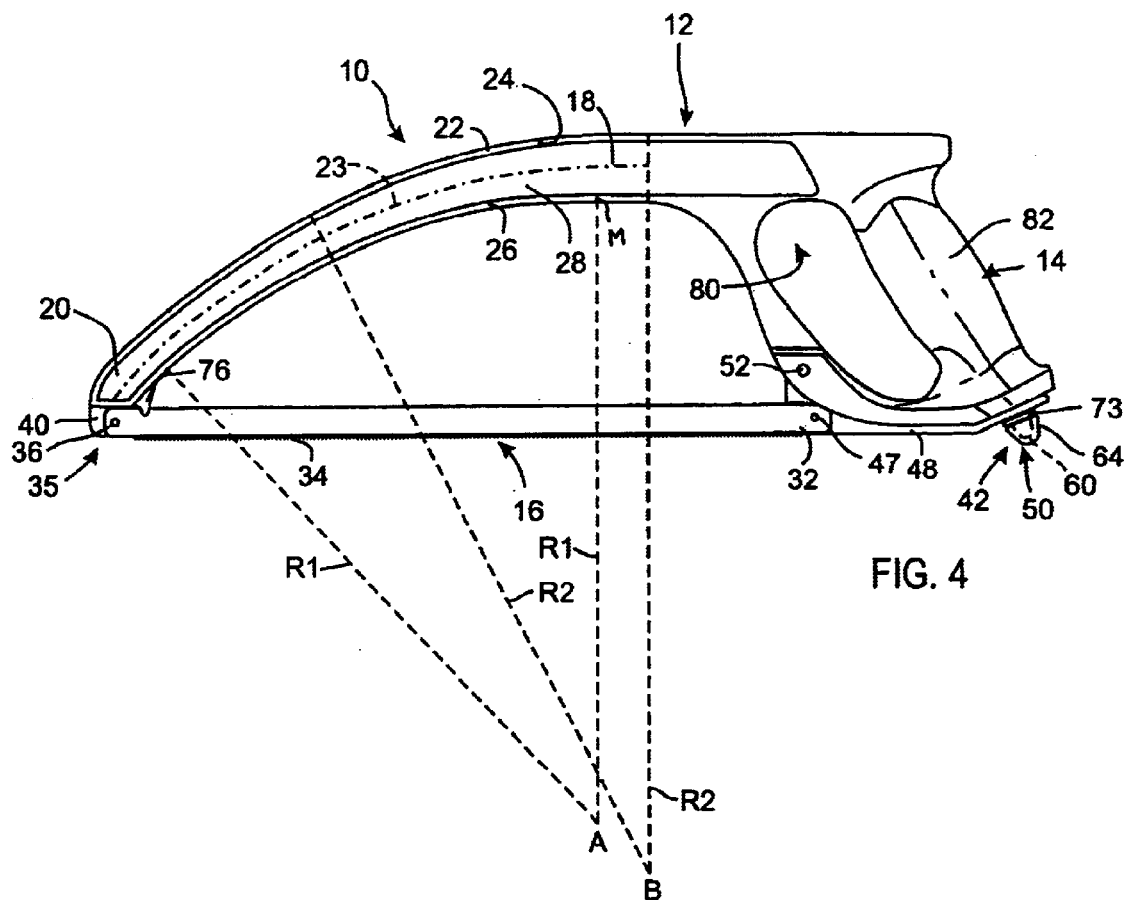
FIG. 4 is a view similar to FIG. 2 with added reference lines to illustrate the curvature of a frame member of the hacksaw.

Preferably, the curvature of the frame 12 is defined as a result of (a) the lower end cap 26 of the I-beam frame member 12 extending arcuately from the rearward end portion 18 to the forward end portion 20 along a portion of the circumference of an imaginary circle (not shown) having a centerpoint labeled A and a radius labeled R1 in FIG. 4 and (b) the upper end cap 24 of the I-beam frame member 12 extending arcuately between the rearward end portion 18 and forward end portion 20 along the circumference of a second imaginary circle (not shown) having a centerpoint labeled B and a radius labeled R2 in FIG. 4. The centerpoints A and B are located below the blade 16. Preferably, radius R2 of the second imaginary circle is greater than the radius R1 of the first imaginary circle and the first and second centerpoints A, B are spaced apart from one another. The preferred radius R1 of the first imaginary circle is between 8 and 18 inches and the most preferred measurement for R1 is approximately 12.7 inches. The preferred radius R2 of the second imaginary circle is between 10 and 20 inches and the most preferred measurement for R2 is approximately 10.75 inches.

The manner in which the elongated blade 16 is mounted in the low profile hacksaw 10 and tensioned can be appreciated with reference to FIGS. 1, 2, 5 and 6. The elongated blade 16 has a first end portion 30, a second end portion 32 and a cutting edge portion 34. A first blade mounting structure, generally designated 35, is provided on the forward end portion 20 of the frame member 12 and includes a metal forward post member 36 that is mounted in a bore 38 formed in a planar portion 40 of the forward end portion 20. The second end portion 32 of the elongated blade 16 is mounted on a second blade mounting structure 44 which is provided by a releasable blade tensioning device, generally designated 42, and best seen in the exploded view of FIG. 1. The releasable blade tensioning device 42 includes a lever 48 pivotally mounted to the handle 14 and a tensioning mechanism, generally designated 50. A forward end of the lever 48 is pivotally mounted to the handle 14 by a pivot pin 52. The second blade mounting structure 44 is of similar construction to the first blade mounting structure 35 and includes a post 47 mounted in a bore 49 formed in a planar portion 51 of the lever 48.

Figure 5:
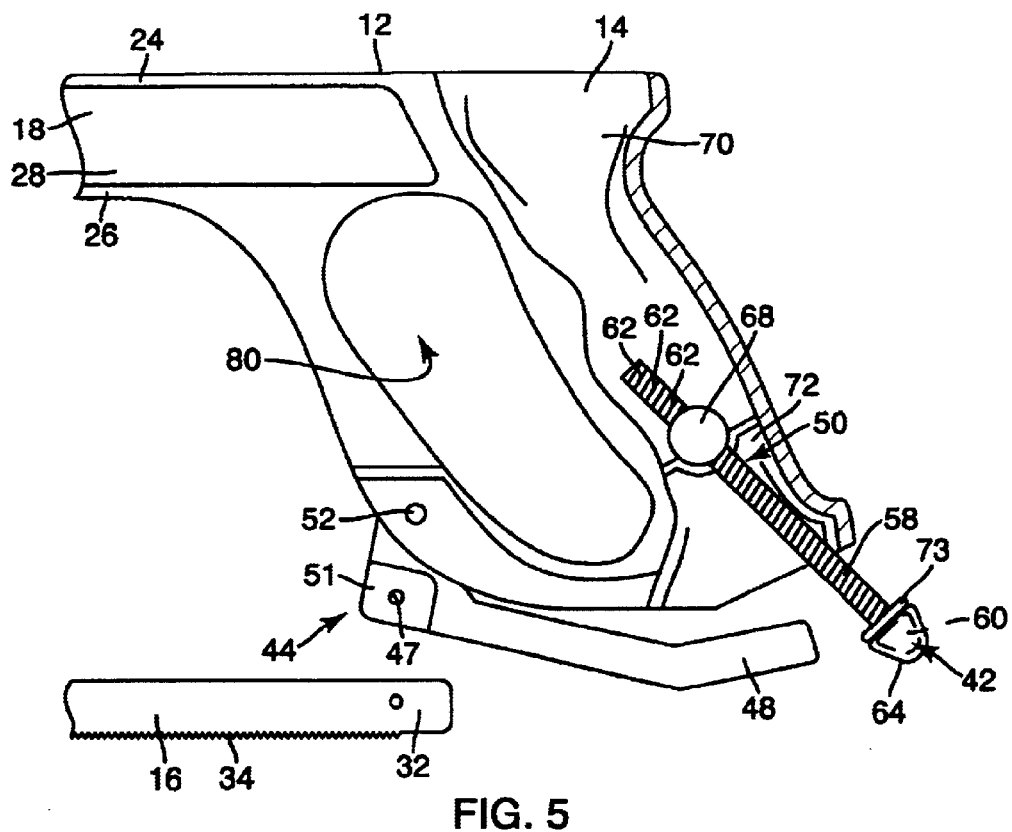
FIG. 5 is fragmentary view of the low profile hacksaw with a portion of the handle thereof broken away to show a tensioning mechanism of a blade tensioning device moved away from a lever of the device and a fragmentary portion of a hacksaw blade in exploded view.
Figure 6:
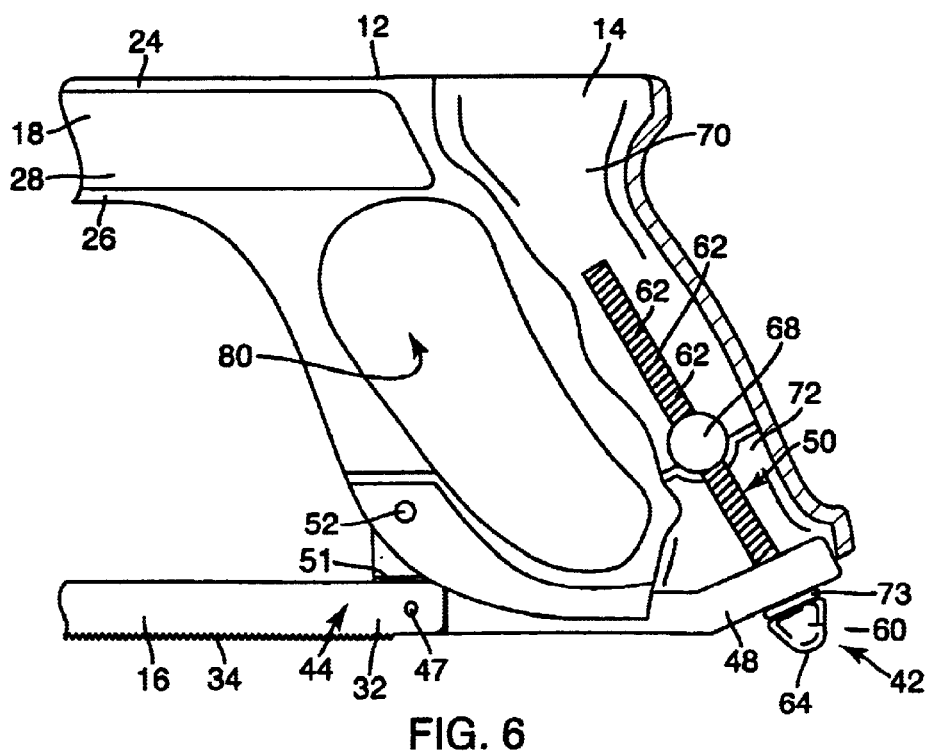
FIG. 6 is a view similar to FIG. 5 showing the tensioning mechanism engaged with the lever and showing the blade mounted in the blade tensioning device.

The lever has an opening 54 formed therethrough by a slot 56. The tensioning mechanism 50 comprises a threaded rod 58 with a head 60 fixed on one end and threads 62 formed at the opposite end. The head 60 is received in an opening (not shown) in an abutment member 64 which is mounted on the threaded rod 58. As shown in FIGS. 5–6, the interior of the handle 14 of the low profile hacksaw 10 is hollow.

FIG. 5 shows the tensioning mechanism 50 mounted to the handle 14. The threaded rod 58 extends through the opening 54 in the lever 48 and is threadedly received within a threaded bore 66 which is formed in a cylindrical structure 68 disposed within the handle interior 70. The cylindrical structure 68 is supported by arcuately shaped opposing wall portions 72 integrally formed on opposite sides of the handle interior 70. A conventional washer 73 is disposed between the abutment member 64 and the lever 48. Rotating the abutment member 64 in a tightening direction rotates the head 60 and hence the threaded rod 58 so that the rod 58 travels axially inwardly. As a result, the head 60 (acting through the abutment member 64 and the washer 73) forces the lever 48 to pivot upwardly in a tensioning direction. Specifically, the rod 58 is drawn inwardly with respect to the handle interior when rotated in the tightening direction as a result of the threaded engagement between the rod 58 and the bore 66. Rotating the abutment member 64 a loosening direction rotates the head 60 and rod 58 in the same loosening direction and causes the rod 58 to move outwardly with respect to the handle interior 70 as a result of the same threaded engagement. This pivots the lever 48 in a releasing direction opposite the tensioning direction to release tension in the elongated blade.

To use the low profile hacksaw 10 to cut a workpiece, the user first mounts the elongated blade 16 in the hacksaw 10 and tightens the blade to a desired degree of tension. To mount the blade 16, the user loosens the tensioning mechanism 50 and pivots the same to the position shown in FIG. 5 to allow the lever 48 to pivot downwardly in the releasing direction about pivot pin 52 sufficiently for the second end portion 32 of the elongated blade 16 to be mounted on the rearward post 47. The user mounts the holes 74, 75 formed in the first and second end portions 30, 32, respectively, of the elongated blade 16 over the respective posts 36, 47. The lever 48 is then pivoted upwardly in the tensioning direction and the threaded rod 58 of the tensioning mechanism 50 is pivoted into slot 56. The tensioning mechanism 50 is then tightened by rotating the abutment member 64 in the tightening direction as aforesaid. A retaining flange 76 integrally formed on the forward end portion 20 of the frame member 12 extends downwardly past an upper edge of the elongated blade 16 to help maintain the same on the post 36 while the tensioning mechanism 50 is being tightened.

As a result of pivoting the lever 48 in the tensioning direction, the releasable blade tensioning device 42 affects relative movement between the first and second blade mounting structures 35, 44 to tension the blade 16 and thereby apply a rearwardly directed force to the forward end portion 20 of the frame member 12. The releasable blade tensioning device 42 also affects relative movement between the first and second blade mounting structures 35, 44 as the lever 48 pivots downwardly in the releasing direction thereof to release the tension to allow for removal and replacement of the blade 16.

The frame member 12 is constructed and arranged such that the rearwardly directed load applied to the forward end portion 20 of the frame member 12 creates a bending moment that is distributed throughout and resisted by the frame member 12. As a result of providing the frame member 12 with a broad curvature, the rearwardly directed tension load applied by the blade 16 is prevented from concentrating or focusing at any given point. Specifically, defining the curvature along at least one arc having a center of curvature located below the blade 16 ensures that this focusing of bending moment does not occur.

Once the blade is mounted in the low profile hacksaw 10 and tensioned to the desired degree using the tensioning mechanism 50, of the releasable blade tensioning device 42, the hacksaw 10 is ready to cut a workpiece. The handle 14 has an opening 80 formed therethrough and a rear gripping portion 82 adjacent the opening 80. The user can manually grasp the handle 14 by inserting his hand through the opening 80 and gripping the gripping portion 82 of the handle 14.

The cutting edge 34 of the tensioned blade 16 is placed on the workpiece at a location where the cut is to be made and the low profile hacksaw 10 is moved forwardly and rearwardly in a reciprocating manner to cut the workpiece. The blade 16 penetrates the workpiece until the inner surface of the frame member 12 comes in contact with the same. The rearward end portion 18 of the frame member 12 is spaced relatively far from the elongated blade 16 so that the user can cut through relatively thick workpieces. The vertical height of the low profile hacksaw 10 between the blade and frame member 12 limits the space in which the saw can be inserted to cut a workpiece, however. The forward end portion 20 of the frame member 12 is sloped and is relatively close to the elongated blade 16 so that the user can use the forward portion of the frame member 12 and blade 16 for cutting operations in relatively confined spaces.

Figure 7:
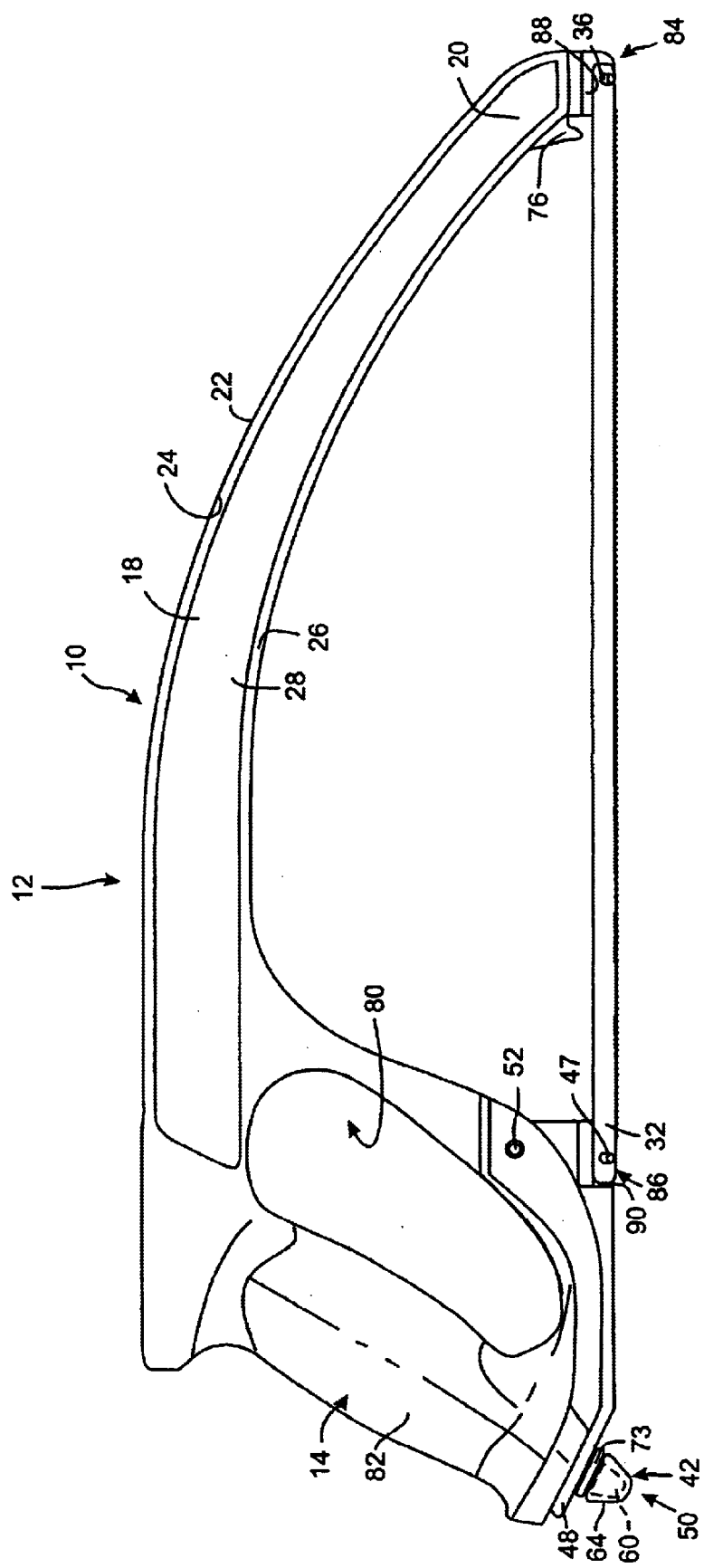
FIG. 7 is a side elevational view of a second side of the hacksaw in an assembled condition showing the blade angularly mounted therein.

The forward end portion 20 of the frame 12 is also provided with an angular forward blade mounting structure, generally designated 84, and the lever 48 is provided with an angular rearward blade mounting structure, generally designated 86. These angular blade mounting structures 84, 86 are angled with respect to blade mounting structures 35, 44 and allow the blade 16 to be mounted at an angle with respect to its normal position. The angular blade mounting structures 84, 86 are substantially identical to the first and second blade mounting structures 35, 44. Preferably, the planar surfaces 88, 90 of the structures 84, 86 are disposed at approximately a forty five degree angle with respect to the frame 12 and handle 14. FIG. 7 shows the blade 16 mounted angularly with respect to the frame 12 and handle 14 at a forty five degree angle.

Figure 8:
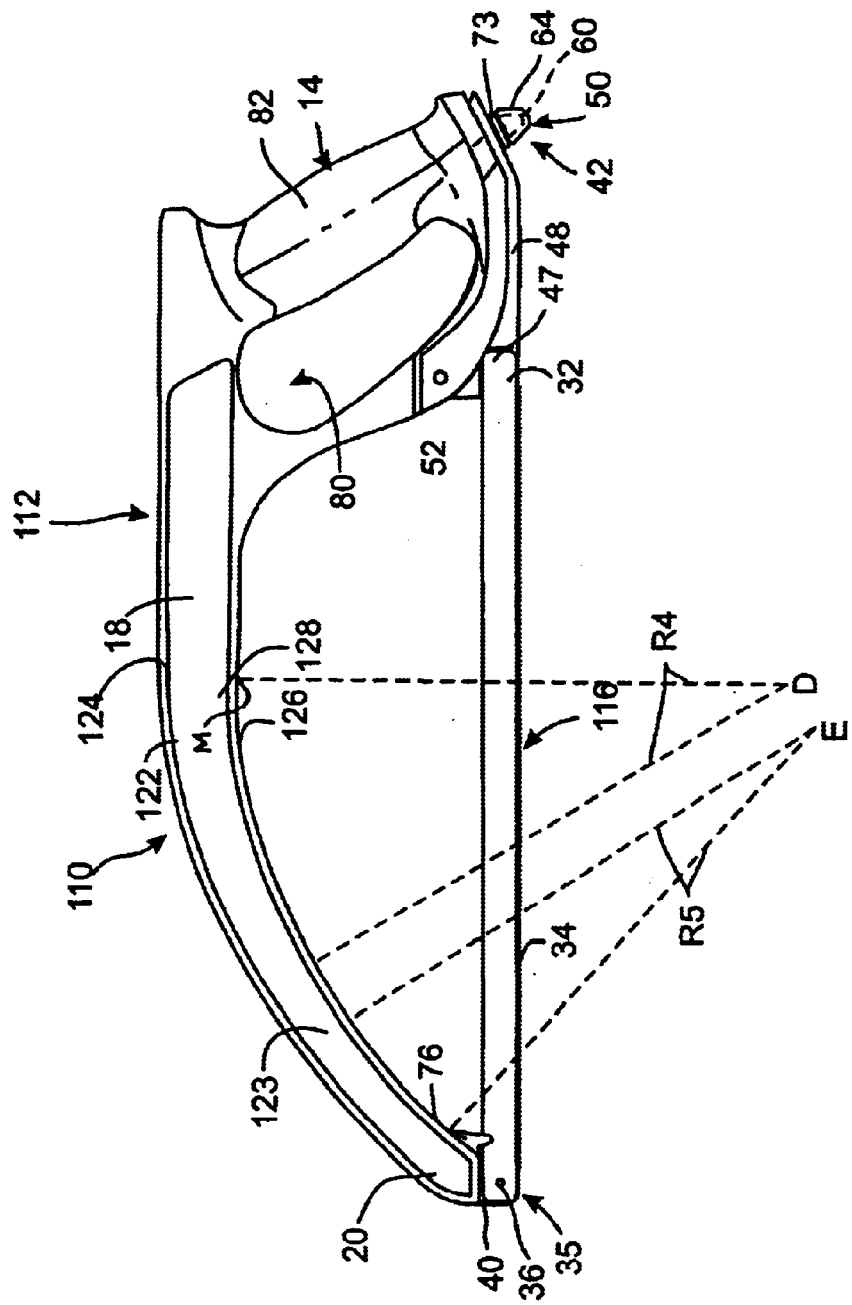
FIG. 8 is a view similar to FIG. 4 of a second embodiment of the low profile hacksaw showing reference lines to illustrate the curvature of a plurality of arcuate portions of the frame member of the hacksaw.

It can be appreciated that the low profile hacksaw 10 shown in FIGS. 1–7 is intended to be exemplary only and is not intended to be limiting. It is within the scope of the invention to provide a low profile hacksaw wherein the frame member includes an arcuate portion which is defined along more than one arc. An example of a hacksaw 110 with a frame member 112 that includes such an arcuate portion is shown in FIG. 8. Portions of the low profile hacksaw 110 that are identical to structures on the low profile hacksaw 10 are given identical reference numbers and are not described further. The frame member 112 of the hacksaw 110 includes an arcuate portion having two sections 122 and 123. The sections 122 and 123 are defined along two different arcs each having a different center of curvature located below the blade 116. The frame member 112 of the hacksaw 110 has an I-beam construction with upper end cap 124, lower end cap 126 and web 128 extending therebetween.

The arcs along which frame sections 122, 123 extend are only illustrated with respect to the lower end cap 126 in FIG. 8, but it can be appreciated that similar circle segments can be defined for the upper end caps 124. The lower end cap 126 of the first section 122 extends generally along a portion of the circumference of an imaginary circle having a centerpoint labeled D and a radius labeled R4 in FIG. 8. The lower end cap 126 of the second section 123 extends along the circumference of an imaginary circle having a centerpoint labeled E and a radius labeled R5. In this arrangement, the length of radius R4 is greater than the length of radius R5.

It is also contemplated to provide a deformable gripping material (not shown) on the gripping portion of the handle to cushion the gripping portion and to enhance manual grasping and comfort. The gripping material may be molded directly to the gripping portion of the handle member and may be a single layer of molded material or multiple molded layers including an inner foam layer bonded to the handle surface and an exterior molded layer of a skin material surrounding the foam layer.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

It should be noted that the limitations of the appended claims are not phrased in the "means . . . for performing a specified function" format permitted by 35 U.S.C. sec. 112, par. 6. This is to make clear the intention that the appended claims are not to be interpreted under that section as being limited solely to the structures disclosed in the specification and their equivalents.

What is claimed:

1. A low profile hacksaw comprising:

an elongated blade having opposing longitudinal end portions and a cutting edge between said longitudinal end portions;

a hacksaw frame assembly comprising a rigid I-beam frame member with upper and lower end caps and a generally vertical web member extending therebetween, said frame member having a forward end portion, a maximum height portion, and an arcuate portion defined along at least one arc having a center of curvature located below said blade when said hacksaw is oriented in an upright position with the cutting edge of the blade facing downwardly, said arcuate portion extending substantially the entire length between said forward end portion and the maximum height portion and curving downwardly and forwardly towards said forward end portion to provide said hacksaw with a lower overall height at the forward end portion of said frame member than at the maximum height portion, said maximum height portion being defined at the point where both the distance between said blade and said lower end cap is a maximum and the arcuate portion begins its downward and forward curvature;

a first blade mounting structure carried by the hacksaw frame assembly, one of said longitudinal end portions of said blade being removably mounted on said first blade mounting structure;

a releasable blade tensioning device carried by the hacksaw frame assembly and providing a second blade mounting structure on which the other of said longitudinal end portions of said blade is removably mounted, said blade tensioning device being movable to (a) effect relative tensioning movement between said first and second blade mounting structures to tension said blade in the longitudinal direction thereof, and (b) to effect relative releasing movement between said first and second blade mounting structures to release the tension to allow for removal and replacement of said blade;

one of said first and second blade mounting structures being provided on said forward end portion of said frame member such that the tension in said blade caused by the relative tensioning movement of said blade mounting structures applies a rearwardly directed load to said forward end portion to create a bending moment which is distributed along said arcuate portion with said upper end cap along said arcuate portion being subject to tension and said lower end cap along said arcuate portion being subject to compression so that said upper and lower end caps cooperate to resist deflection of said frame member; and said hacksaw frame assembly further comprising a manually engageable handle connected to said frame member for being manually grasped to enable performance of a cutting operation wherein the cutting edge of the tensioned blade is engaged with a work piece and moved forwardly and rearwardly to cut the work piece.

2. A low profile hacksaw according to claim 1, wherein the lower end cap of said I-beam frame member extends arcuately from a rearward end portion of said frame member to the forward end portion of said frame member along a portion of the circumference of a first imaginary circle having a first centerpoint located below said blade, said maximum height portion being defined at said rearward end portion;

said upper end cap of said I-beam frame member extending arcuately from the rearward end portion of said frame member to the forward end portion of said frame member along a portion of the circumference of a second imaginary circle having a second centerpoint located below said blade.

3. A low profile hacksaw according to claim 2, wherein the radius of said second imaginary circle is greater than the radius of said first imaginary circle.

4. A low profile hacksaw according to claim 3, wherein said first and second centerpoints are spaced apart from one another.

5. A low profile hacksaw according to claim 4, wherein the radius of said first imaginary circle is between 8 and 18 inches.

6. A low profile hacksaw according to claim 5, wherein the radius of said second imaginary circle is between 10 and 20 inches.

7. A low profile hacksaw according to claim 6, wherein the radius of said first imaginary circle is approximately 12.7 inches.

8. A low profile hacksaw according to claim 6, wherein the radius of said second imaginary circle is approximately 10.75 inches.

9. A low profile hacksaw according to claim 1, wherein said frame member is metal.

10. A low profile hacksaw according to claim 9, wherein said handle is formed integrally with said frame member as a one-piece construction with said frame member extending forwardly from said handle.

11. A low profile hacksaw according to claim 10, wherein said handle has an opening formed therethrough and a rear gripping portion adjacent said opening, said handle being constructed and arranged such that a user can manually grasp said handle by inserting his fingers through said opening and gripping said gripping portion.

12. A low profile hacksaw according to claim 11, wherein said handle has a hollow interior.

13. A low profile hacksaw according to claim 1, wherein said blade tensioning device comprises:

a lever pivotally mounted to said handle, said lever providing the second blade mounting structure to which the other opposing end portion of said blade is removably mounted;

a tensioning mechanism constructed and arranged to (a) pivot said lever in a tensioning direction to effect relative movement between said blade mounting structures and thereby tension said blade and (b) fix said lever with respect to said handle to thereby maintain the tension in said blade.

14. A low profile hacksaw according to claim 1, wherein said at least one arc comprises only one arc which extends substantially the entire length of said arcuate portion.

15. A low profile hacksaw according to claim 1, wherein said handle is formed integrally with said frame member as a one-piece construction with said frame member extending forwardly from said handle.

16. A low profile hacksaw according to claim 15, wherein said handle has an opening formed therethrough and a rear gripping portion adjacent said opening, said handle being constructed and arranged such that a user can manually grasp said handle by inserting his fingers through said opening and gripping said gripping portion.

17. A low profile hacksaw according to claim 16, wherein said handle has a hollow interior.

18. A low profile hacksaw according to claim 1, wherein said blade tensioning device comprises:

a lever pivotally mounted to said handle, said lever providing the second blade mounting structure to which the other opposing end portion of said blade is removably mounted;

a tensioning mechanism constructed and arranged to (a) pivot said lever in a tensioning direction to effect relative movement between said blade mounting structures and thereby tension said blade and (b) fix said lever with respect to said handle to thereby maintain the tension in said blade.

19. A low profile hacksaw according to claim 18, wherein said lever has an opening formed therethrough and wherein said tensioning mechanism comprises a threaded rod with a head fixed on one opposing end thereof and a structure defining a threaded bore located within said handle, said rod being inserted through the opening formed through said lever with said head engaging said lever and the other opposing end portion thereof opposite said head threadingly received within said threaded bore such that (a) rotating said rod in a tightening direction causes said head to engage said lever and pivot said lever in the tensioning direction to tension said blade and (b) rotating said rod in a loosening direction opposite said tightening direction allows said lever to pivot in a releasing direction opposite said tensioning direction to release tension in said blade.

20. A low profile hacksaw according to claim 1, wherein said first blade mounting structure is provided on said forward end portion of said frame member.

\* \* \* \* \*